(12) United States Patent
Persson et al.

(10) Patent No.: US 12,001,369 B2
(45) Date of Patent: Jun. 4, 2024

(54) BROADCAST REGIONS FOR MULTI-PROCESSOR ARRANGEMENT

(71) Applicant: Arm Limited, Cambridge (GB)

(72) Inventors: Erik Persson, Lund (SE); Graeme Leslie Ingram, Melbourne (GB); Rune Holm, Oslo (NO); John Wakefield Brothers, III, Calistoga, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/709,293

(22) Filed: Mar. 30, 2022

(65) Prior Publication Data
US 2023/0315670 A1    Oct. 5, 2023

(51) Int. Cl.
*G06F 13/42*    (2006.01)
*G06N 5/04*    (2023.01)

(52) U.S. Cl.
CPC ............... *G06F 13/42* (2013.01); *G06N 5/04* (2013.01)

(58) Field of Classification Search
CPC ....................................................... G06F 13/10
See application file for complete search history.

(56) References Cited

U.S. PATENT DOCUMENTS

| | | | |
|---|---|---|---|
| 4,975,909 A * | 12/1990 | Masson | H04L 12/42 370/422 |
| 8,135,024 B2 | 3/2012 | Abel et al. | |
| 9,373,438 B1 | 6/2016 | Ikriannikov et al. | |
| 11,520,717 B1 | 12/2022 | Clarke et al. | |
| 2008/0018359 A1 | 1/2008 | Schmit et al. | |
| 2008/0040739 A1 * | 2/2008 | Ketchum | H04N 21/26225 725/35 |
| 2013/0294458 A1 | 11/2013 | Yamaguchi et al. | |
| 2013/0322459 A1 | 12/2013 | Xu | |
| 2015/0178435 A1 | 6/2015 | Kumar | |
| 2017/0295111 A1 | 10/2017 | Sadowski et al. | |
| 2018/0279389 A1 * | 9/2018 | Kwag | H04L 12/2803 |
| 2019/0069238 A1 * | 2/2019 | Choi | H04W 72/0446 |
| 2019/0205746 A1 | 7/2019 | Nurvitadhi et al. | |

OTHER PUBLICATIONS

Office Action, U.S. Appl. No. 17/709,255, dated Apr. 6, 2023, 22 pages.
Response to Office Action, U.S. Appl. No. 17/709,255, filed Jul. 5, 2023, 28 pages.
Notice of Allowance, U.S. Appl. No. 17/709,255, dated Aug. 8, 2023, 15 pages.
Issue Fee, U.S. Appl. No. 17/709,255, filed Nov. 8, 2023, 6 pages.
Search Report under Section 17(5), App. No. GB2304043.9, dated Aug. 11, 2023, 5 pages.
Malumbres, et al., "An efficient implementation of tree-based multicast routing for distributed shared-memory multiprocessors," ScienceDirect, vol. 46, Issue 11, Sep. 2000, pp. 1019-1032.

(Continued)

*Primary Examiner* — Henry Tsai
*Assistant Examiner* — Juanito C Borromeo
(74) *Attorney, Agent, or Firm* — Berkeley Law & Technology Group, LLP

(57) ABSTRACT

The present disclosure relates generally to multi-processor arrangements and, more particularly, to broadcast regions for multi-processor arrangements.

20 Claims, 10 Drawing Sheets

(56) References Cited

OTHER PUBLICATIONS

Bolotin, et al., "QNoC: QoS architecture and design process for network on chip," ScienceDirect, vol. 50, Issues 2-3, Feb. 2004, pp. 105-128.
Restriction Requirement, U.S. Appl. No. 17/709,280, dated Jun. 30, 2023, 6 pages.
Response to Restriction Requirement, U.S. Appl. No. 17/709,280, filed 7/32/2023, 12 pages.
Office Action, U.S. Appl. No. 17/709,280, dated Sep. 22, 2023, 12 pages.
Response to Office Action, U.S. Appl. No. 17/709,280, filed Dec. 22, 2023, 17 pages.

\* cited by examiner

BROADCAST REGIONS FOR MULTI-PROCESSOR ARRANGEMENT

BACKGROUND

Field

The present disclosure relates generally to multi-processor arrangements and, more particularly, to broadcast regions for multi-processor arrangements.

Information

Integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Some computing devices, for example, may incorporate multiple processors at least partially coupled together via an interconnect. In some circumstances, implementing electronic interconnects may pose challenges related to, for example, routing, deadlocks, latencies, congestion, etc.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
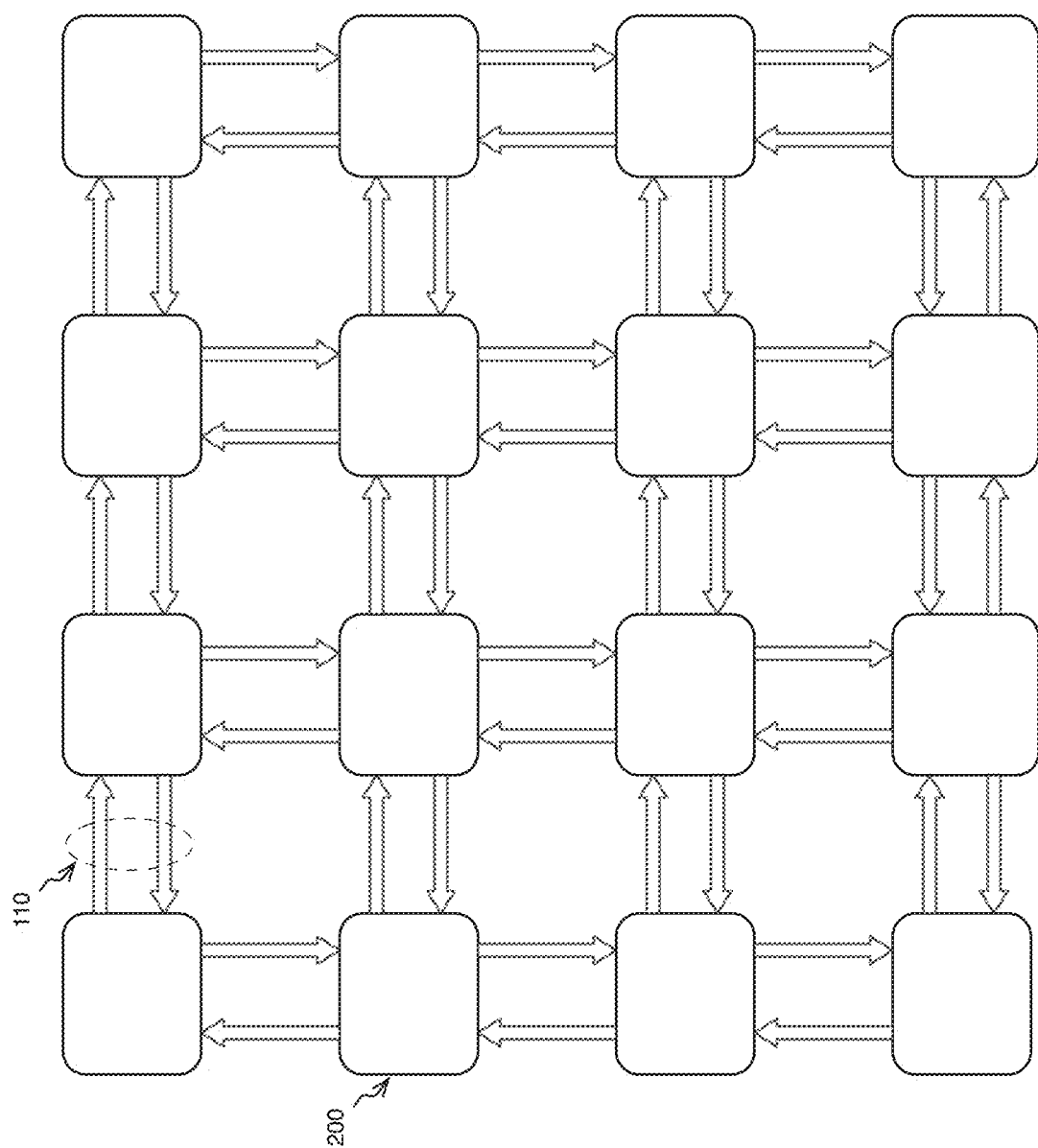
FIG. 1 is a schematic block diagram depicting an embodiment of a multi-processor arrangement including a plurality of processing tiles.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Some computing devices, for example, may incorporate multiple processors at least partially coupled together via an interconnect.

For example, neural networks may find increasing utility in a range of applications including speech recognition, computing device vision applications (e.g., facial recognition, handwriting recognition, etc.), and/or natural language processing, to name but a few examples. Relatively large neural network models, for example, may utilize considerable memory storage space, memory interface bandwidth, and/or computing resources, for example. To perform neural network inference operations, for example, some computing devices may incorporate multiple processing units. As discussed more fully below, implementing multiple processing units within a computing device may pose particular challenges with respect to efficient and/or reliable transfer of signals and/or signal packets between and/or among processing units. In some circumstances, implementing multi-processor assemblies may pose challenges related to, for example, routing, deadlocks, latencies, congestion, etc.

For example, embodiments directed at least in part to reducing and/or eliminating deadlocks and/or directed at least in part to supporting efficient communication of signals and/or signal packets within a multi-processor arrangement may include, for example, establishing one or more particular processing entities within the multi-processor arrangement as broadcast hubs. Also, as explained more fully herein, a multi-processor arrangement may be partitioned into multiple broadcast regions, for example.

FIG. 1 is a schematic block diagram depicting an embodiment 100 of a multi-processor arrangement. In implementations, multi-processor arrangements, such as arrangement 100, may include a plurality of processing tiles, such as processing tiles 200. "Processing tile" and/or the like refers to an arrangement comprising one or more processing units (e.g., one or more processor cores). For example, arrangement 100 may be referred to as a "multi-core processor." "Processing unit," "processor core" and/or the like may be utilized herein interchangeably. In an implementation, arrangement 100 may comprise a neural processing unit (NPU), although subject matter is not limited in scope in this respect. Further, in an implementation, NPU 100 may be implemented on a single semiconductor die, although, again, subject matter is not limited in scope in these respects.

For a multi-core processor, such as NPU 100, efficient transfer of signals and/or signal packets between and/or among the various processor cores and/or between processor cores and memory (e.g., memory external to the various processor cores) may be advantageous. In an implementation, the multi-processor arrangement of NPU 100 may comprise sixty-four processor cores, although subject matter is not limited in scope in this respect. For example, NPU 100 may comprise sixteen processing tiles 200. Further, for example, individual processing tiles 200 may include four processor cores (see, for example, FIG. 2, discussed below). For implementations that include relatively larger numbers of processor cores, an electronic interconnect may not directly couple individual processor cores to all other processor cores. Rather, for example, NPU 100 may comprise a mesh arrangement as depicted in FIG. 1. As shown in FIG. 1, in an implementation, individual processing tiles 200 of the mesh arrangement of NPU 100 may be coupled to adjacent processing tiles 200 via an electronic interconnect 110, as discussed more fully below.

Figure 2:
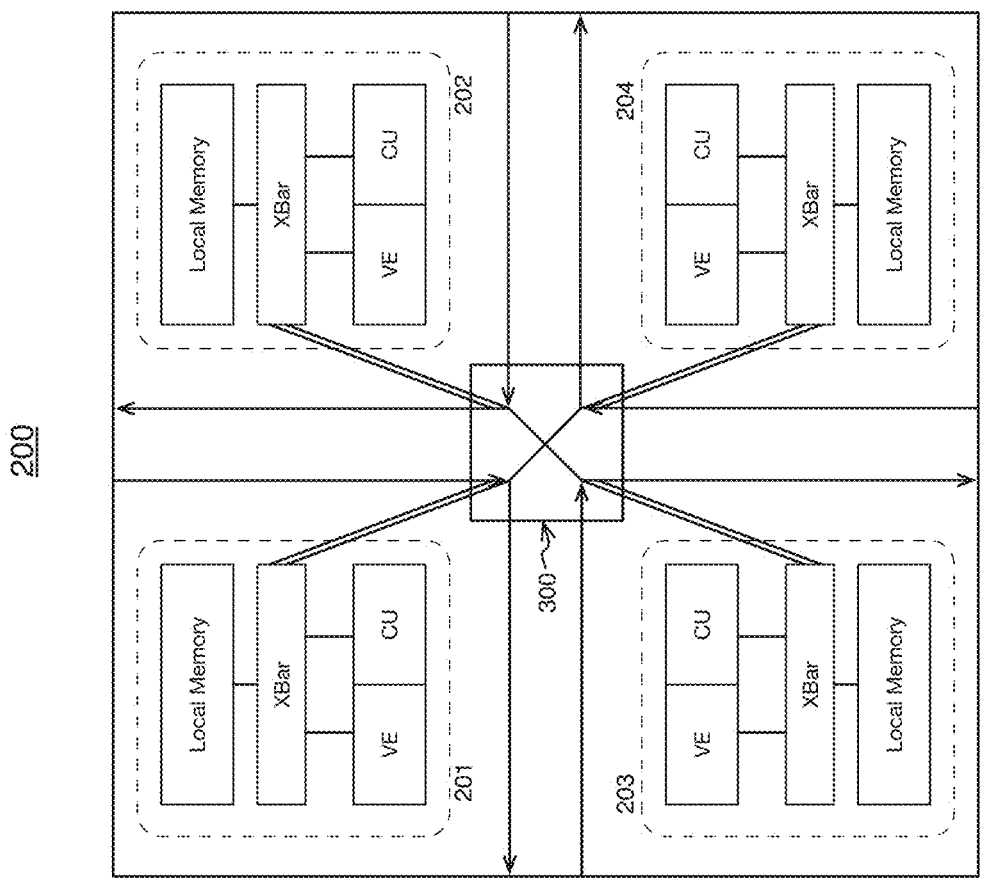
FIG. 2 is a schematic block diagram depicting an embodiment of a processing tile.

FIG. 2 is a schematic block diagram depicting an embodiment of a processing tile, such as processing tile 200. As mentioned, in an implementation, a processing tile may include one or more processor cores. For example, processor tile 200 may comprise processor cores 201, 202, 203 and/or 204. In an implementation, individual processor cores, such as processor core 201, may include one or more execution units, such as a vector execution unit (VE) and/or a convolution unit (CU). Also, in an implementation, individual processor cores, such as processor core 201, may include a local memory (e.g., local shared buffer). Various memories and/or execution units with individual processor cores may be at least partially coupled via an interconnect, such as a crossbar (XBar) interconnect, for example. Although processor cores 201-204 are depicted as comprising particular execution units, interconnects and/or memories, for example, a wide range of arrangements, configurations, etc. are possible in a variety of implementations.

Figure 3:
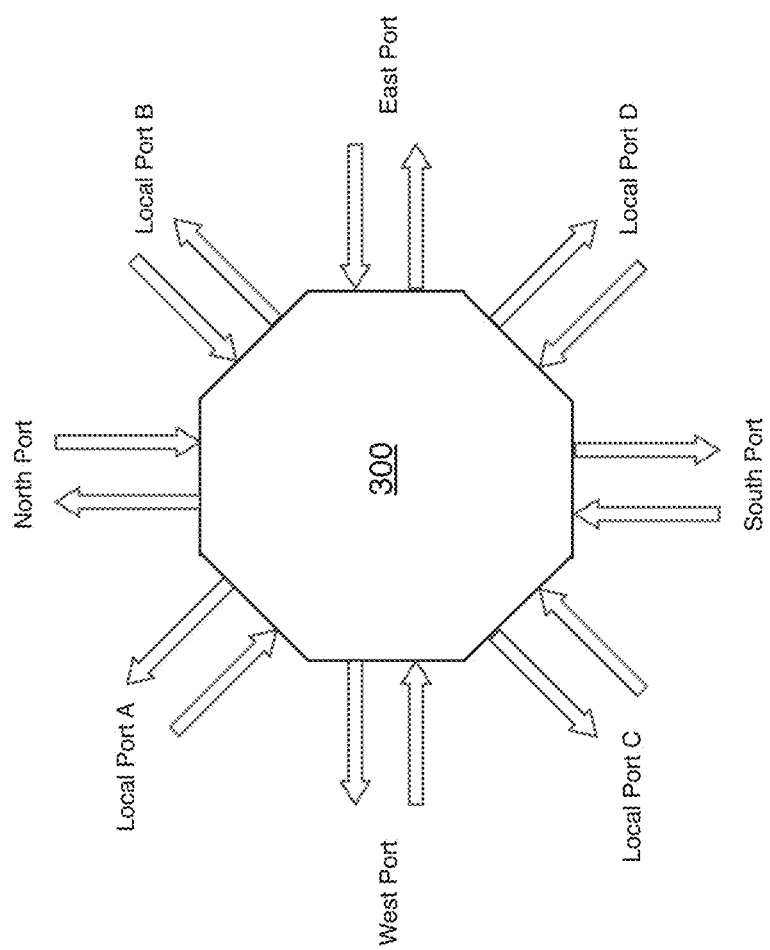
FIG. 3 is a schematic block diagram depicting an embodiment of a cross-point circuit for an example processing tile.

FIG. 3 depicts an embodiment 300 of an example cross-point circuit. As depicted in FIG. 2, individual processing units 200 may comprise multiple (e.g., four) processor cores interconnected by way of cross-point circuit 300, in an implementation. Cross-point circuit 300 may also facilitate communication between adjacent processing tiles 200, for example.

In an implementation, cross-point circuit 300 may comprise one or more ports (e.g., four ports) coupled to one or more (e.g., four) processor cores. For example, a local port A of cross-point circuit 300 may facilitate communication with processor core 201, a local port B may facilitate communication with processor core 202, a local port C may facilitate communication with processor core 203 and/or a local port D may facilitate communication with processor core 204. Further, for example, cross-point circuit 300 may include multiple (e.g., four) ports to facilitate communication with multiple (e.g., four) adjacent processing tiles. In an implementation, cross-point circuit 300 may include north, south, east and/or west ports to facilitate communication with one or more adjacent processing tiles. In an implementation, cross-point circuits 300 within individual processing tiles 200 may communicate with adjacent processing tiles 200 via interconnect 110.

In implementations, for applications involving neural networks, for example, multiple processing tiles (e.g., all processing tiles) and/or multiple processor cores (e.g., all cores) within NPU 100 may participate in performing a particular neural network inference operation. Further, a neural network layer may be split spatially over various processing tiles 200 and/or processor cores. For example, feature map traffic may be relatively spatial in character and, in an implementation, neural network inference operations may be scheduled such that parts of an input feature map may be shared between physically adjacent processor cores and/or physically adjacent processing tiles. In an implementation, utilization of a mesh arrangement, such as the example mesh arrangement of NPU 100, may lead to efficient power and/or bandwidth utilization for spatially-scheduled operations.

However, in some circumstances, signal packet traffic in an NPU, such as NPU 100, for example, may be more global than spatial in character and/or may be scheduled to be shared among multiple processing tiles. For example, parameters, such as neural network weight parameters, may be obtained from a memory, such as an external (e.g., external to the mesh arrangement of NPU 100) dynamic random access memory (DRAM) and/or the parameters may be transmitted to multiple processing tiles, such as processing tiles 200. Also, for example, parameters, such as neural network weight parameters, may be obtained from multiple processor tiles 200 and/or the obtained parameters may be transmitted to multiple processor tiles 200. Further, feature map parameters, for example, may be obtained from an external memory and/or from one or more local memories (e.g., memories local to one or more individual processor cores of one or more processing tiles 200) and the obtained feature map parameters may be transmitted to a plurality of processing tiles 200. Of course, these are merely examples of transmission types and/or parameter types that may involve multiple processing tiles 200, and subject matter is not limited in scope in these respects.

In some circumstances, multi-processor arrangements, such as the mesh arrangement of NPU 100, may pose challenges with respect to deadlocks as signal packets are communicated between and/or among processing tiles, such as processing tiles 200. For example, if arbitrary signal packet traffic is allowed within a multi-processor arrangement such as NPU 100, circular dependencies may arise that may result in signal packet traffic becoming stuck.

To address such challenges, interconnect 110 of NPU 100, for example, may include an example transport protocol comprising a link layer and a memory access layer. In an implementation, a link layer may include a channel having separate request (REQ) and response (RSP) virtual channels utilizing the same physical layer wiring. In an implementation, interconnect 110 may comprise one or more wires interconnecting the various processing tiles 200 and each of the one or more wires of interconnect 110 may be shared by both REQ and RSP virtual channels. For example, REQ and RSP virtual channels may conduct respective logical streams that may flow independently so that backpressure in one stream does not block the other. By keeping REQ and RSP signal packets on separate virtual channels, REQ signal packets may not stall RSP signal packets and/or RSP signal packets may not stall REQ signal packets, for example.

In an implementation, separate register slices within respective cross-point circuits 300 for individual processing tiles 200 may be utilized for respective REQ and RSP virtual channels so that communications in one of the virtual channels can continue in circumstances where the other of the virtual channels is stalled. Further, in an implementation, a memory access layer for the present example transport protocol may include read request, write request, read response and/or write response signal packet types, although subject matter is not limited in scope in these respects.

In an implementation, routing characteristics for individual cross-point circuits 300 may be programmable. For example, cross-point circuit 300 may include registers that may be programmed to specify particular behaviors with respect to the north, south, east and/or west ports to facilitate communication with one or more adjacent processing tiles.

Figure 4:
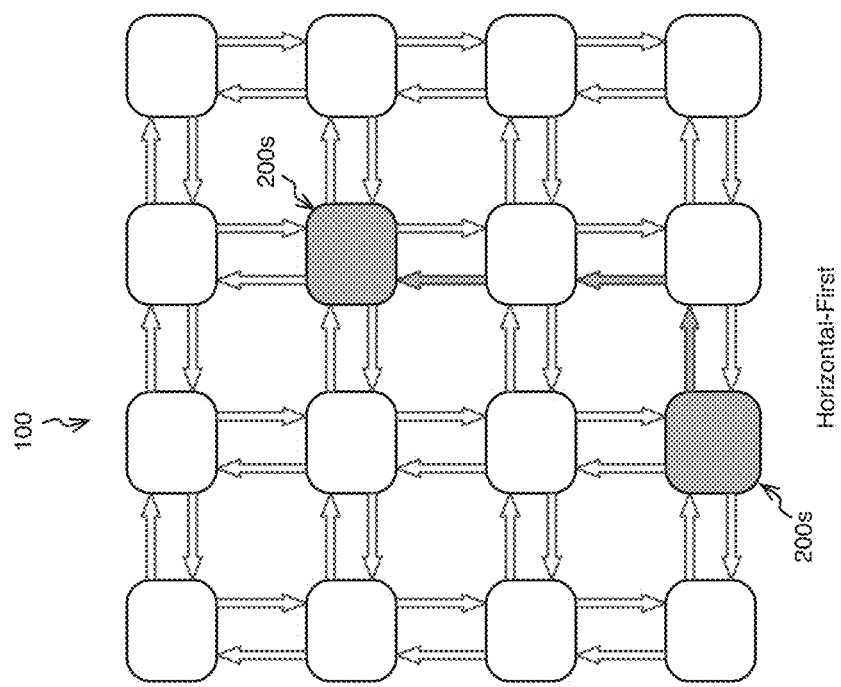
FIG. 4 is a schematic block diagram depicting example routing of example signal packets within a multi-processing tile arrangement.
Figure 4:
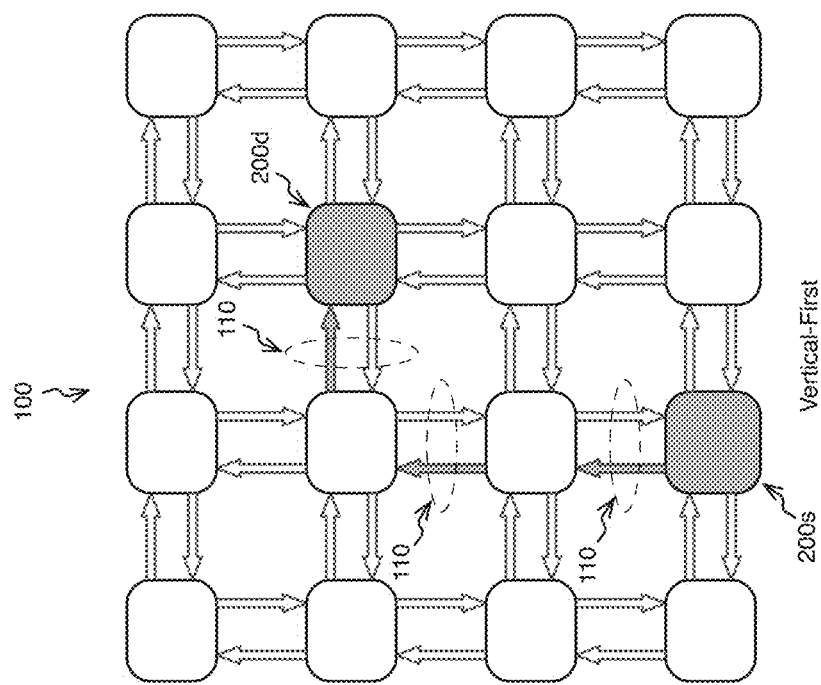

FIG. 4 is a schematic block diagram depicting example routing scenarios within a multi-processor arrangement, such as the example mesh arrangement of NPU 100. In implementations, further measures to avoid deadlocks may include particular rules for routing signal packets through cross-point circuits 300 of respective processing tiles 200. For example, vertical-first or horizontal-first rules for routing of signal packets may be implemented. In an implementation, priority for signal packet routing as the signal packet traverses individual cross-point circuits 300 may be given to either a vertical or horizontal dimension. For example, a signal packet may first travel along a prioritized dimension then along the other dimension as it advances towards a destination. As depicted in FIG. 4, for vertical-first routing, a signal packet may be communicated between a source processing tile 200*s* and a destination processing tile 200*d* by first traversing interconnect 110 in a vertical direction and then in a horizontal direction (e.g., if needed to reach the intended destination), as depicted in FIG. 4. Further, for horizontal-first routing, a signal packet may be communicated between source processing tile 200*s* and destination processing tile 200*d* by first traversing interconnect 110 in a horizontal direction and then in a vertical direction (e.g., if needed to reach the intended destination), as depicted in FIG. 4. Vertical-first and/or horizontal-first routing priorities may be established via programming of one or more configuration registers within respective cross-point circuits 300 for the various processing tiles 200, in an implementation.

The above-discussed example techniques for avoiding deadlock conditions within a multi-processor arrangement, such as the example mesh arrangement of NPU 100, may be effective for unicast communication (e.g., single transmission source, single destination) of signal packets. However, in some circumstances, it may be advantageous to employ broadcast communications within a multi-processor arrangement, such as NPU 100.

For example, multi-processor arrangement performance may tend to be limited by parameter (e.g., weight parameter) read bandwidth in some circumstances. For example, in some circumstances, parameters (e.g., weight parameters) may be stored in local memories within one or more processing tiles 200 and/or such parameters may be retrieved from the various local memories so that NPU 100 can perform neural network inference operations. In other circumstances, neural network parameters may be stored in one or more external memories (e.g., memories external to the mesh arrangement of NPU 100). Again, such parameters may be retrieved from the one or more external memories so that NPU 100 can perform neural network inference operations. Also, in some circumstances, a number of processing tiles and/or processor cores may be scheduled to receive the same parameters. Further, in some circumstances, parameters may be retrieved from multiple processing tiles and/or processor cores and may be to be distributed to the multiple processing tiles and/or processor cores may be located in multiple processing tiles and/or processor cores (e.g., uniformed shared communication). For at least these reasons, broadcast communications within a multi-processor arrangement (e.g., NPU 100), for example, may provide efficiency and/or performance advantages in some circumstances. However, the example techniques discussed above for avoiding deadlock conditions may, by themselves, be insufficient for broadcast communications in some circumstances.

"Broadcast communication" in this context refers to communication of signals and/or signal packets (e.g., parameters, including feature map parameters, weight parameters, etc.) obtained from one or more sources (e.g., one or more memories and/or one or more processing tiles 200) and distributed to multiple destinations (e.g., multiple processing tiles 200). Similarly, "broadcast signal packet" refers to a signal packet representative of one or more values, parameters (e.g., weight parameters), states, etc. to be communicated between one or more sources (e.g., one or memories and/or one or more processing tiles 200) and a plurality of destinations (e.g., multiple processing tiles 200).

To help address the challenge of avoiding deadlock conditions for broadcast communication of signal packets within the mesh arrangement of NPU 100, for example, a particular processing tile of the plurality of processing tiles 200 may be designated as a broadcast hub. "Broadcast hub" and/or the like refers to a particular processing tile of a plurality of processing tiles through which all broadcast signal packets for a particular multi-processor arrangement flow. In an implementation, a broadcast signal packet may be communicated from one or more processing tiles 200 to a designated broadcast hub. Also, in an implementation, the broadcast hub may subsequently initiate transmission of the broadcast signal packet to a plurality of processing tiles 200 other than the broadcast hub. In an implementation, a particular processing tile of the plurality of processing tiles 200 may be designated as a broadcast hub by programming one or more registers within the particular processing tile, for example. In implementations, any of processing tiles 200 may be designated as a broadcast hub.

Figure 5:
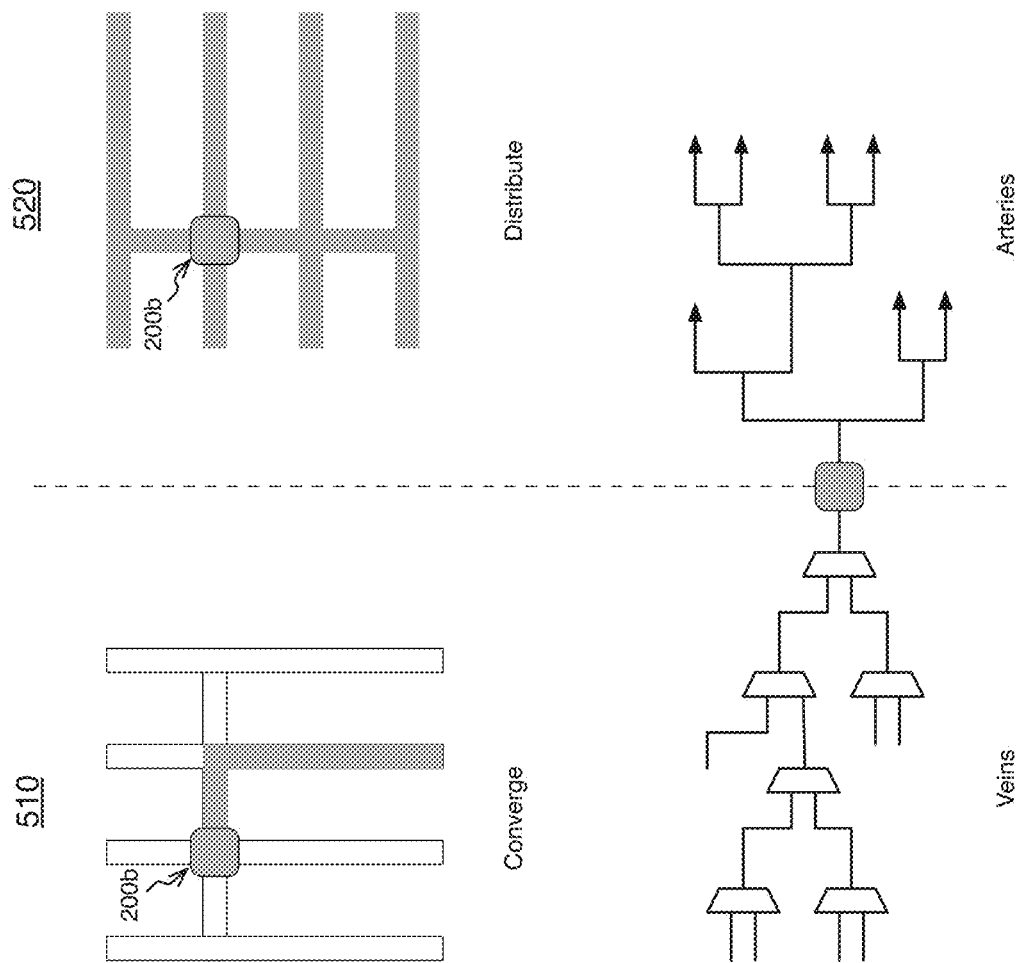
FIG. 5 is a schematic block diagram depicting an example routing of an example broadcast signal packet within a multi-processing tile arrangement.
Figure 6:
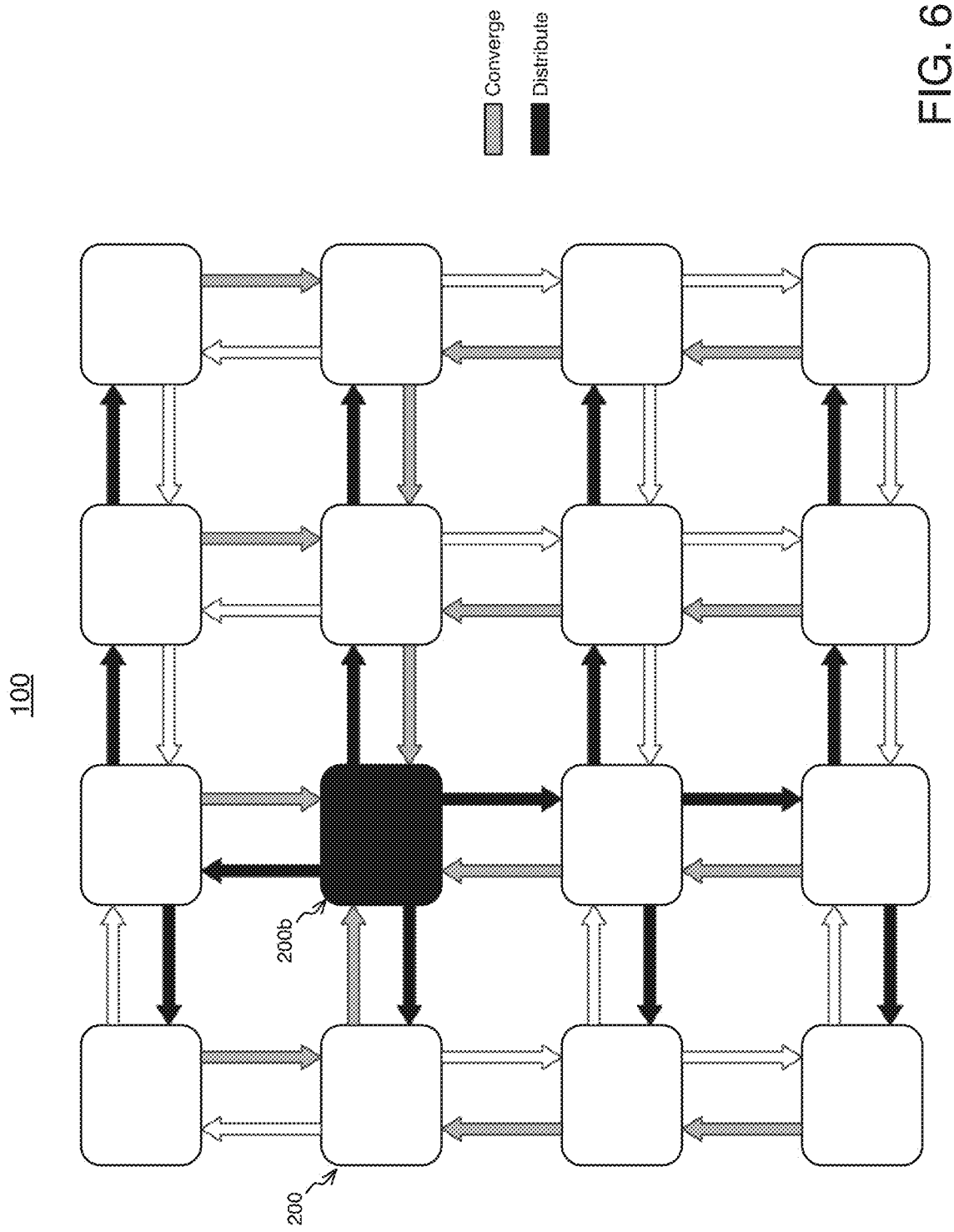
FIG. 6 is a schematic block diagram depicting an example routing of an example broadcast signal packet within a multi-processing tile arrangement.

FIG. 5 and FIG. 6 are schematic block diagrams depicting an example routing of an example broadcast signal packet within a multi-processor arrangement, such as the example mesh arrangement of NPU 100. As depicted, in an implementation, broadcast communication involving a broadcast hub may involve a converge phase 510 and a distribute phase 520. For example, during converge phase 510, broadcast signal packets may converge on a particular processing tile 200b designated as a broadcast hub. In distribute phase 520, broadcast packets may be distributed across the mesh arrangement of NPU 100 via interconnect 110, for example. In an implementation, converging and/or distributed broadcast signal packets may be routed on a vertical-first or horizontal-first basis. Because the converging signal packets and the distributed signal packets may utilize different resources (e.g., links, routes, pathways, etc.) of the mesh arrangement of NPU 100, deadlock conditions may be avoided.

As also depicted in FIG. 5, the example converge/distribute phases for broadcast signal packet communication within the example mesh arrangement of NPU 100 may be visualized as a cardiovascular system having a network of veins flowing to a point of convergence (e.g., heart), with flow then diverging from the point of convergence via a network of arteries. Because veins and arteries comprise separate resources, flow may be maintained without conflict between converging and diverging paths. Similarly, broadcast signal packets may flow from one or more processing tiles 200 across the mesh arrangement of NPU 100 to broadcast hub 200b (e.g., point of convergence), and from broadcast hub 200b the broadcast signal packets may be distributed across the mesh arrangement of NPU 100 to processing tiles 200 other than broadcast hub 200b. Because veins and arteries, so to speak, utilize different resources (e.g., links, routes, pathways, etc.), broadcast signal packet flow to and from broadcast hub 200b (e.g., point of convergence) may be maintained without conflict between converging and distributed broadcast signal packet traffic, in implementations.

For example implementations discussed above, broadcast communications have been contemplated as involving an entirety of a multi-processor arrangement, such as mesh arrangement 100 depicted in FIG. 1 and FIG. 6, for example. As discussed, for a multi-processor arrangement, such as mesh arrangement 100, a particular processing tile, such as processing tile 200b, may be designated as a broadcast hub. Further, broadcast signal packets may converge on this single broadcast hub 200b and broadcast signal packets may be distributed from broadcast hub 200b to all other processing tiles 200 across mesh 100, for example. However, there may be circumstances where it may be more advantageous to partition a multi-processor arrangement, such as mesh arrangement 100, into one or more broadcast regions.

For example, a multi-processor arrangement, such as the mesh arrangement of NPU 100, may be tasked to perform multiple independent operations and/or may be tasked to perform different portions of the same operation. For example, rather than having all of mesh arrangement 100 work on a single particular neural network inference operation, different portions of mesh arrangement 100 may work on different neural network inference operations, in an implementation. Also, for example, different portions of mesh arrangement 100 may work on different portions of a particular neural network inference operation, in an implementation. Of course, neural network inference operations are merely an example computing operation that may be performed by a multi-processor arrangement, such as mesh arrangement 100, and subject matter is not limited in scope in these respects.

Figure 7:
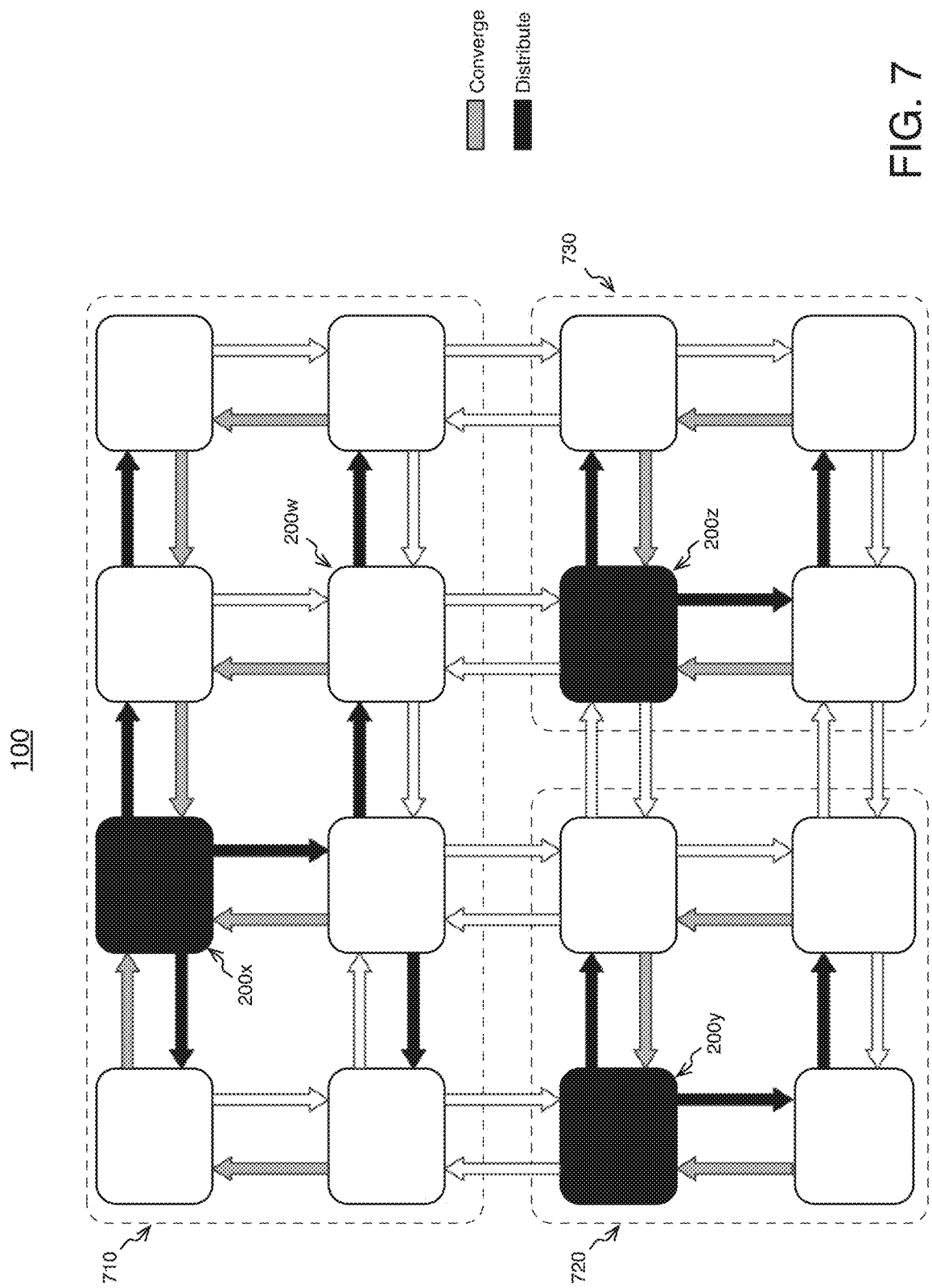
FIG. 7 is a schematic block diagram depicting an embodiment of a multi-processor arrangement partitioned into multiple broadcast regions.

FIG. 7 is a schematic block diagram depicting an embodiment of a multi-processor arrangement, such as mesh arrangement 100, partitioned into multiple broadcast regions. As mentioned, "broadcast communication" and/or the like refers to communication of signals and/or signal packets obtained from one or more sources (e.g., one or more memories and/or one or more processing tiles 200) and distributed to multiple destinations (e.g., multiple processing tiles 200). "Broadcast region" and/or the like in this context refers to a contiguous and/or electrically coupled grouping of processing units and/or processing tiles to which particular broadcast communications are restricted. In an implementation, a particular processing unit and/or processing tile of the grouping may be designated as a broadcast hub.

As depicted in FIG. 7, mesh arrangement 100, for example, may be partitioned into one or more broadcast regions. For example, mesh arrangement 100 may be partitioned into broadcast region 710, broadcast region 720 and/or broadcast region 730. Of course, these are merely examples of how a multi-processor arrangement, such as mesh arrangement 100, may be partitioned into broadcast regions and subject matter is not limited in scope in these respects.

In an implementation, individual broadcast regions may each have identified therein a particular broadcast hub. For example, broadcast region 710 may have a broadcast region 200x specified therein. Broadcast region 720 may include broadcast hub 200y and/or broadcast region 730 may have broadcast hub 200z identified therein.

In an implementation, any processor tile 200 located within a particular broadcast region may be designated as a broadcast hub. Also, in an implementation, only one broadcast hub may be designated at a given point in time, for example. In an implementation, broadcast regions and/or broadcast hubs may be specified dynamically. That is, for example, different broadcast regions and/or broadcast hubs may be specified over time as processing needs change, in an implementation.

In an implementation, routing characteristics for individual cross-point circuits 300 may be programmable. For example, cross-point circuit 300 may include registers that may be programmed to specify particular behaviors with respect to the north, south, east and/or west ports, for example, to facilitate communication with one or more adjacent processing tiles 200. In a particular implementation, cross-point circuits 300 for individual processing tiles 200 may be programmed to specify how to handle broadcast signal packets depending at least in part on the particular processing tile's physical location within a particular broadcast region. For example, a cross-point circuit 300 of processing tile 200w may be programmed to transmit broadcast signal packets (e.g., received via a west port) via an east output port, for example, because the adjacent processing tile to the east of processing tile 200w belongs to broadcast region 710. Also, for this example, cross-point circuit 300 of processing tile 200w may be programmed to refrain from transmitting broadcast signal packets via a south output port because the adjacent processing tile to the south of processing tile 200w does not belong to broadcast region 710. Further, in an implementation, cross-point circuit 300 of processing tile 200w may be programmed to refrain from transmitting broadcast signal packets via a north output port due to a horizontal-first routing protocol, for example. Of course, this is merely an example of how a cross-point circuit 300 of a particular processing tile 200 may be programmed to enforce particular broadcast signal transmission for a particular specified broadcast region and subject matter is not limited in scope in these respects.

Additionally, for example, processing tiles 200 located within broadcast region 710 may be programmed with a particular broadcast region identifier. In an implementation, broadcast signal packets may be forwarded from one processing tile 200 to the next if the next processing tile 200 is a member of the same broadcast region, for example. Thus, in an implementation, distribution of broadcast signal packets may be restricted to a particular broadcast region based at least in part on the programmable states of the various cross-point circuits 300 for the processing tiles 200 located within the particular broadcast region. Thus, for example, individual processing tiles 200 within a broadcast region (e.g., broadcast region 710, 720 or 730) may be programmed to understand how and/or where to direct broadcast signal packets. In such a situation, there may be no need for a broadcast signal packet itself to specify destinations and/or routes, for example.

In another implementation, interconnect 110 may include a subregion/multicast extension that may comprise a programmable set of bitmasks that may be selectable by a field in a broadcast packet header, for example. In an implementation, a subregion/multicast extension for interconnect 110 may include a sixty-four bit bitmask that may be selectable via a broadcast packet header. In this manner, broadcast signal packets may specify a particular region identifier, for example, and distribution of the broadcast signal packets may be restricted to the specified region.

In particular implementations, dynamically specified broadcast regions may allow a multi-processor arrangement, such as the mesh arrangement of NPU 100, to be partitioned into subsets of processing tiles and/or processing units. Individual broadcast regions may act as independent units, for example. In particular implementations, power and/or bandwidth may be saved at least in part by reducing signal packet traffic between different broadcast regions as appropriate. Also, in an implementation, particular broadcast regions may be shut down (e.g., clock signals slowed or stopped, power removed from processing units, etc.) to save power and/or bandwidth.

In an implementation, a compiler, based at least in part on inputs obtained from a programmer, for example, may determine how to partition a particular multi-processor arrangement, such as mesh arrangement 100, into particular broadcast regions based at least in part on particular operations to be executed. For example, a compiler may generate code to dynamically partition mesh arrangement 100 into a plurality of broadcast regions based at least in part on a respective plurality of operations (e.g., neural network inference operations) to be executed and/or on particular portions of one or more operations to be executed, for example.

In implementations, a compiler may make determinations with respect to partitioning a multi-processor arrangement, such as mesh arrangement 100, into a plurality of broadcast regions based at least in part on any of a wide range of criteria. For example, a compiler and/or a programmer may partition a multi-processor arrangement based, at least in part, on processor core utilization. For example, a multi-core processor arrangement may be partitioned in a manner to maximize processor core utilization when the multi-processor arrangement is fully loaded.

Also, for example, a multi-processor arrangement may be partitioned based at least in part on latency considerations (e.g., time to execute a particular neural network inference operation). In an implementation, a multi-processor arrangement may be partitioned in a manner to utilize the smallest broadcast region that meets a specified latency target, for example. Also, for example, a multi-processor arrangement may be partitioned to use a smaller broadcast region for a particular operation, such as a neural network inference operation, in circumstances wherein utilization of a larger broadcast region would not significantly improve latency.

Additionally, in implementations, a compiler and/or a programmer may partition a multi-processor arrangement based at least in part on energy consumption (e.g., leakage power). For example, a computing system and/or device may comprise multiple power domains. Also, for example, an NPU may have multiple power domains (e.g., groups of processor cores and/or individual cores comprising particular power domains). In circumstances wherein different processor cores are in different power domains, power may be conserved by keeping a subset of power domains (e.g., a single power domain) on and/or turning off other power domains, for example. Also, for example, in circumstances wherein processor cores are in a particular power domain, a compiler and/or programmer may utilize the processor cores belonging to the particular power domain to complete a task, such as a neural network inference operation, as quickly as possible and then may subsequently turn off the particular power domain to conserve power. In implementations, power may be applied and/or turned off for different power domains dynamically, for example.

Additionally, in implementations, a compiler and/or a programmer may partition a multi-processor arrangement based, at least in part, on external memory (e.g., DRAM) bandwidth. For example, a larger partition may utilize less external memory bandwidth due at least in part to relatively more local memory available in local processor cores to store parameters (e.g., weight parameters and/or feature map parameters) and/or due at least in part to a reduced need to re-read parameters from external memory and/or to write parameters to external memory.

Also, in implementations, a compiler and/or a programmer may partition a multi-processor arrangement based, at least in part, on user and/or programmer specified partitioning parameters. For example, a programmer may specify minimum and/or maximum partitions that a particular task (e.g., neural network inference operation) is allowed to utilize. For example, it may be advantageous to reserve a portion of a multi-processor arrangement, such as mesh arrangement 100, for a safety-critical task, in an implementation.

Although various examples of criteria for partitioning a multi-processor arrangement into broadcast regions have been discussed, subject matter is not limited in scope to the particular examples provided. Also, in implementations, a compiler and/or programmer may combine any combination of criteria in determining how and/or whether to partition a multi-processor arrangement into broadcast regions.

As mentioned, in implementations, a multi-processor arrangement, such as mesh arrangement 100, may be partitioned into multiple broadcast regions to concurrently execute different neural network inference operations. For one example use case, two neural networks may be inferred at different rates. A first neural network (e.g., a vision neural network) may take five milliseconds to infer and may be inferred at a rate of sixty frames per second, for example. A second neural network (e.g., an audio neural network) may take fifty milliseconds to infer and may be inferred at a rate of ten frames per second, for example. In such an example circumstance, using a unified (e.g., non-partitioned) multi-processor arrangement, it may be disadvantageous to delay performance of the first neural network inference operations while the multi-processor arrangement performs inference operations for the second neural network. One approach for avoiding this disadvantageous situation (e.g., utilizing a non-partitioned multi-processor arrangement) may be to give priority to the first neural network over the second neural network. However, this may result in relatively frequent swapping-out of relatively large amounts of signals and/or states to and/or from local memories within the various processor cores of the multi-processor arrangement, for example.

In implementations, to avoid disadvantageous circumstances such as those mentioned above, a compiler, based at least in part on inputs obtained from a programmer, for example, may partition the multi-processor arrangement, such as mesh arrangement 100, into multiple (e.g., two) broadcast regions. A first broadcast region comprising a first plurality of processing tiles may perform inference operations for the first neural network and a second broadcast region comprising a second plurality of processing tiles may perform inference operations for the second neural network, for example. In this particular example, partitioning of the multi-processor arrangement into multiple broadcast regions may be fixed at least in part in accordance with the particular use case provided to the compiler by a programmer. Of course, in other implementations, partitions may be dynamically configured based at least in part on changing processing circumstances.

The example discussed above includes inference operations for multiple neural networks performed concurrently in multiple respective broadcast regions. For another example use case, a compiler, based at least in part on inputs obtained from a programmer, for example, may partition a multi-processor arrangement, such as mesh arrangement 100, into multiple (e.g., two) broadcast regions to execute different portions of the same neural network. For example, in a circumstance in which a moderately-sized neural network may be executed on a relatively large multi-processor arrangement, such as mesh arrangement 100, there may not exist sufficient levels of parallelism to fill the entire multi-processor arrangement with execution of a particular neural network layer. In such an example circumstance, it may be advantageous to partition the multi-processor arrangement into multiple broadcast regions to perform multiple respective paths and/or portions of a particular neural network inference operation concurrently.

In implementations, a compiler, for example, may select particular strategies for partitioning a multi-processor arrangement, such as mesh arrangement 100, into multiple broadcast regions utilizing a search process similar in at least some respects to how a compiler may generally make other scheduling decisions. For example, a search may be performed via brute-force techniques, dynamic programming techniques, and/or heuristics.

In a particular implementation, partitioning of a multi-processor arrangement, such as mesh arrangement 100, into multiple broadcast regions may be based, at least in part, on prioritizing latency (e.g., time to execute a particular neural network inference operation) and/or external memory traffic (e.g., accesses to and/or from DRAM) characteristics. Of course, as mentioned, a compiler may base determinations with respect to partitioning a multi-processor arrangement, such as mesh arrangement 100, into a plurality of broadcast regions on any of a wide range of criteria and subject matter is not limited in scope in these respects.

Figure 8:
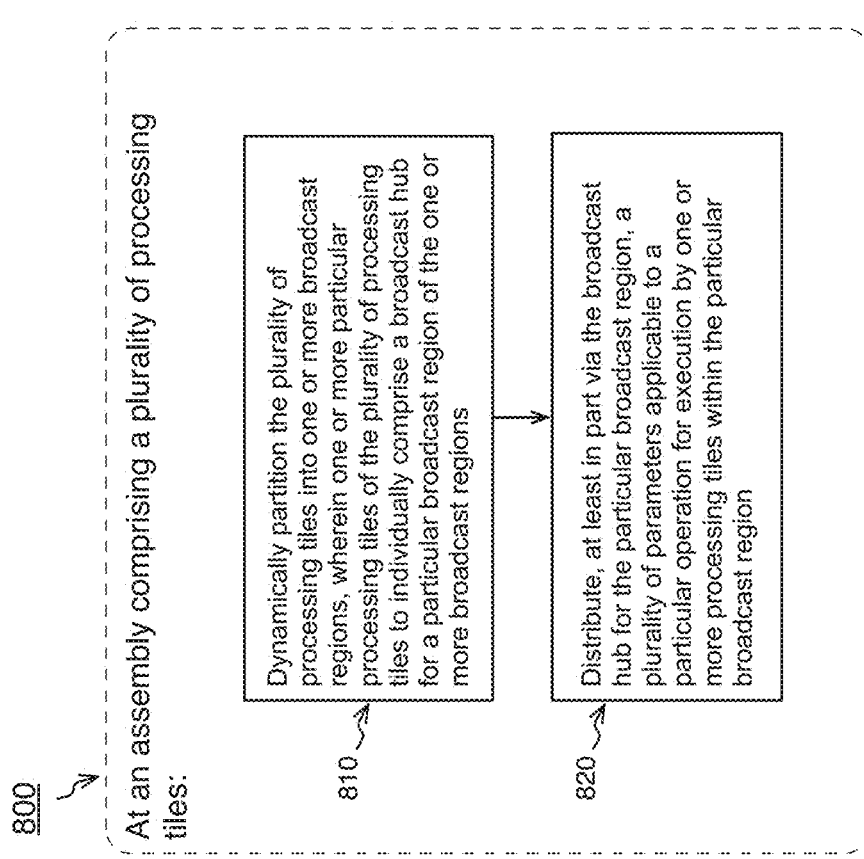
FIG. 8 is a flow diagram depicting an embodiment of a process for partitioning a multi-processor arrangement into one or more broadcast regions.

FIG. 8 is a flow diagram depicting an embodiment 800 of a process for partitioning a multi-processor arrangement into one or more broadcast regions. In a particular implementation, process 800 may include operations that may be performed in conjunction with example multi-processor arrangement 100, for example. It should be noted that content acquired or produced, such as, for example, input signals, output signals, operations, results, etc. associated with example process 800 may be represented via one or more digital signals and/or signal packets. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In an implementation, example process 800 may be performed, at least in part, at an arrangement comprising a plurality of processing tiles, such as mesh arrangement 100, for example. As depicted at block 810, example process 800 may include dynamically partitioning the plurality of processing tiles, such as processing tiles 200 of mesh arrangement 100, into one or more broadcast regions (e.g., broadcast region 710), for example. In an implementation, one or more particular processing tiles (e.g., processing tile 200x) of the plurality of processing tiles 200 may comprise broadcast hubs for the one or more respective broadcast regions. For example, a mesh arrangement having been partitioned into "x" broadcast regions may include "x" number of processing tiles designated as broadcast hubs for their respective broadcast regions.

Further, as depicted in block 820, example process 800 may include distributing, at least in part via the broadcast hub (e.g., broadcast hub 200x) for the particular broadcast region (e.g., broadcast region 710), a plurality of parameters applicable to a particular operation for execution by one or more processing tiles within the particular broadcast region, in an implementation. For example, a plurality of parameters applicable to a particular neural network inference operation may be distributed within a particular broadcast region, in an implementation.

In an implementation, example process 800 may further comprise obtaining, at least in part via the broadcast hub (e.g., broadcast hub 200x) for the particular broadcast region (e.g., broadcast region 710), the plurality of parameters from one or more signal packets received from at least one of the one or more processing tiles assigned to the particular broadcast region. Example process 800 may additionally include distributing, at least in part via the broadcast hub (e.g., broadcast hub 200x) for the particular broadcast region (e.g., broadcast region 710), the obtained plurality of parameters to processing tiles in the particular broadcast region other than the broadcast hub, in an implementation.

In an implementation, individual processing tiles 200 may comprise a plurality of processing units coupled via a cross-point circuit, such as cross-point circuit 300. Additionally, for example, process 800 may further include programming one or more registers of individual processing tiles of the plurality of processing tiles 200 to configure routing operations for cross-point circuits 300 of the individual processing tiles. In an implementation, dynamically partitioning the plurality of processing tiles 200 into the one or more broadcast regions (e.g., broadcast regions 710, 720 and/or 720) may comprise programming one or more registers of the one or more individual processing tiles of the plurality of processing tiles 200.

Example process 800 may additionally comprise designating the particular processing tile of the particular broadcast region (e.g., broadcast region 710) as the broadcast hub (e.g., broadcast hub 200x) for the particular broadcast region via programming one or more registers within a cross-point circuit 300 of the particular processing tile.

In an implementation, distributing the obtained plurality of parameters to the processing tiles in the particular broadcast region (e.g., broadcast region 710) other than the broadcast hub (e.g., broadcast hub 200x) for the particular broadcast region comprises restricting distribution of the obtained plurality of parameters to the particular broadcast region (e.g., broadcast region 710) via programming of one or more cross-point circuits 300 of one or more individual processing tiles of the particular broadcast region to specify to the one or more cross-point circuits which output ports to direct broadcast signal packets. Further, for example, distributing the obtained plurality of parameters to the processing tiles in the particular broadcast region (e.g., broadcast region 710) other than the broadcast hub (e.g., broadcast hub 200x) for the particular broadcast region comprises distributing one or more broadcast signal packets lacking parameters indicative of the particular broadcast region. In such an implementation, individual processing units within a broadcast region may be programmed to understand where to direct broadcast signal packets. In such a situation, there is no need for the broadcast signal packet itself to specify destinations and/or routes, for example.

In another implementation, distributing the obtained plurality of parameters to the processing tiles 200 in the particular broadcast region (e.g., broadcast region 710) other than the broadcast hub (e.g., broadcast hub 200x) for the particular broadcast region may comprise distributing one or more signal packets comprising parameters indicative of particular routings and/or indicative of particular processing tiles as destinations. For this particular example implementation, the broadcast signal packets may specify particular destinations and/or routings.

Further, in an implementation, one or more processing units may individually comprise neural processor units. Also, in an implementation, dynamically partitioning a multi-processor arrangement into one or more broadcast regions may comprise dynamically partitioning the arrangement into a plurality of broadcast regions based at least in part on a respective plurality of neural network inference operations to be performed or on a respective plurality of portions of a particular neural network inference operation to be performed, or a combination thereof, for example.

Figure 9:
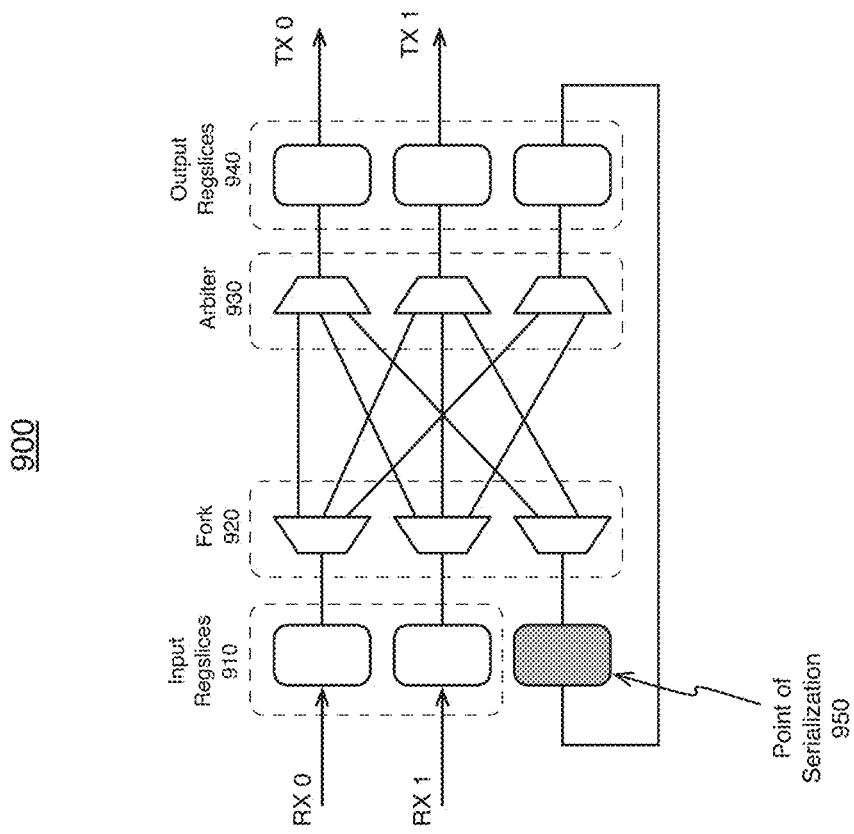
FIG. 9 is a schematic block diagram depicting an embodiment of a point of serialization.

FIG. 9 is a schematic block diagram of an embodiment 900 of an example point-of-serialization circuit. In implementations, cross-point circuit 300, for example, may be implemented to incorporate a point of serialization. "Point of serialization," "point-of-serialization circuit" and/or the like in this context refers to a circuit of a cross-point circuit through which broadcast signal packets received at one or more input ports of the cross-point circuit are routed. In implementations, a point-of-serialization circuit, such as point-of-serialization circuit 900, may prevent, at least in part, deadlock conditions within the cross-point circuit. In an implementation, point-of-serialization circuit 900 may include input register slices 910, fork circuits 920, an arbiter circuit 930, output register slices 940 and/or a point of serialization register slice 950, for example.

In implementations, because a cross-point circuit, such as cross-point circuit 300, may receive broadcast signal packets from multiple sources and/or may transmit broadcast signal packets to multiple destinations, circular dependencies may develop. For example, an arbiter may mutually lock up two forks and/or output register slices and may maintain the arbitration status throughout transmission of the particular broadcast signal packet.

In an implementation, to help avoid deadlock conditions within a cross-point circuit, such as cross-point circuit 300, broadcast signal packets received at one or more input register slices 910 (e.g., all broadcast signal packets received at any input register slices) may be routed through point of serialization register slice 950. Also, in an implementation, arbiter 930 may assign the particular broadcast signal packet to a particular output register slice 940. Further, for example, once transmission of a particular broadcast signal packet has begun with respect to the cross-point circuit, arbiter 930 may not switch output ports for the particular broadcast signal packet throughout transmission of the particular broadcast signal packet. In this manner, for example, broadcast signal packet traffic may be serialized and no two broadcast serial packets will become deadlocked within the cross-point circuit.

In implementations, point-of-serialization circuits and/or techniques may be utilized in conjunction with other deadlock avoidance approaches including, for example, vertical-first and/or horizontal-first routing approaches, broadcast hub approaches, etc.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hyper-media, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 10:
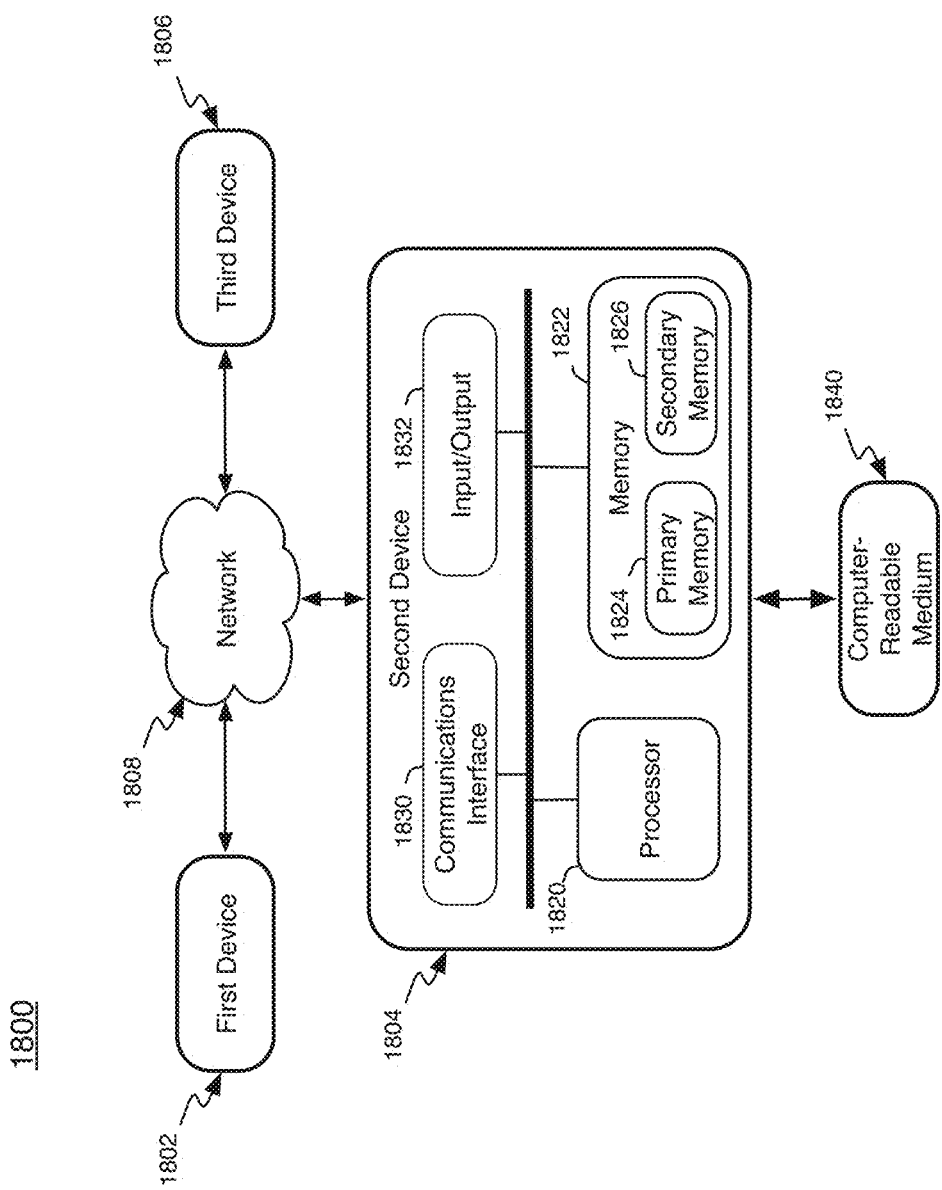
FIG. 10 is a schematic diagram illustrating an embodiment of an example computing device.

In one example embodiment, as shown in FIG. 10, a system embodiment may comprise a local network (e.g., device 1804 and medium 1840) and/or another type of network, such as a computing and/or communications network. For purposes of illustration, therefore, FIG. 10 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-9 and in the text associated at least with the foregoing figure(s) of the present patent application.

Referring now to FIG. 10, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 10, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1804, as depicted in FIG. 18, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 10, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
a plurality of processing tiles, wherein individual processing tiles of the plurality of processing tiles to comprise one or more processing units; and
an interconnect to electronically couple the individual processing tiles of the plurality of processing tiles to two or more other processing tiles of the plurality of processing tiles;
wherein the plurality of processing tiles to be dynamically partitioned into one or more broadcast regions; and
wherein at least one first processing tile of the plurality of processing tiles to comprise a broadcast hub for a first broadcast region of the one or more broadcast regions, wherein the broadcast hub for the first broadcast region to initiate distribution of a plurality of parameters applicable to a first operation for execution by one or more processing tiles within the first broadcast region.

2. The apparatus of claim 1, wherein:
for the first broadcast region, the broadcast hub to obtain the plurality of parameters from one or more signal packets received from at least one of the one or more processing tiles within the first broadcast region; and
the broadcast hub for the first broadcast region to initiate distribution of the obtained plurality of parameters to the one or more processing tiles within the first broadcast region other than the broadcast hub.

3. The apparatus of claim 2, wherein the one or more processing units of the individual processing tiles to comprise a plurality of processing units to be coupled via a cross-point circuit, and wherein routing operations for individual cross-point circuits of the individual processing tiles to be programmable.

4. The apparatus of claim 3, wherein the plurality of processing tiles to be partitioned into the one or more broadcast regions via programming of one or more registers within the cross-point circuits of the individual processing tiles.

5. The apparatus of claim 3, wherein the at least one of the one or more processing tiles to be designated as the broadcast hub for the first broadcast region via programming of one or more registers within at least one cross-point circuit of the at least one processing tile.

6. The apparatus of claim 2, wherein distribution of the obtained plurality of parameters from the broadcast hub for the first broadcast region to be restricted to the first broadcast region via programming of one or more cross-point circuits of the one or more processing tiles within the first broadcast region to specify respective particular output ports of the one or more cross-point circuits of the one or more processing tiles within the first broadcast region to which broadcast signal packets are to be directed.

7. The apparatus of claim 6, wherein the distribution of the obtained plurality of parameters from the broadcast hub for the first broadcast region to include distribution of one or more broadcast signal packets, wherein the one or more broadcast signal packets to lack parameters indicative of the first broadcast region.

8. The apparatus of claim 2, wherein distribution of the obtained plurality of parameters to comprise distribution of one or more signal packets to include one or more parameters indicative of particular routings and/or indicative of particular processing tiles as destinations.

9. The apparatus of claim 1, wherein the plurality of processing tiles to be dynamically partitioned into a plurality of broadcast regions based at least in part on a respective plurality of operations to be performed or based, at least in part, on a respective plurality of portions of a particular operation to be performed, or a combination thereof.

10. The apparatus of claim 1, wherein the one or more processing units to individually comprise neural processor units and wherein the first operation for execution by the one or more processing tiles within the first broadcast region to comprise a neural network inference operation.

11. A method, comprising: at an arrangement comprising a plurality of processing tiles:
dynamically partitioning the arrangement into one or more broadcast regions, wherein one or more processing tiles of the plurality of processing tiles to individually comprise a broadcast hub for a first broadcast region of the one or more broadcast regions; and
distributing, at least in part via the broadcast hub for the first broadcast region, a plurality of parameters applicable to a first operation for execution by one or more processing tiles within the first broadcast region.

12. The method of claim 11, further comprising:
obtaining, at least in part via the broadcast hub for the first broadcast region, the plurality of parameters applicable to the first operation from one or more signal packets received from at least one of the one or more processing tiles within the first broadcast region; and
distributing, at least in part via the broadcast hub for the first broadcast region, the obtained plurality of parameters to the one or more processing tiles within the first broadcast region other than the broadcast hub.

13. The method of claim 12, wherein the distributing the obtained plurality of parameters to the one or more processing tiles within the first broadcast region other than the broadcast hub comprises restricting distribution of the obtained plurality of parameters to the first broadcast region via programming of one or more cross-point circuits of the one or more processing tiles of the first broadcast region to specify respective particular output ports of the one or more cross-point circuits of the one or more processing tiles within the first broadcast region to which broadcast signal packets are to be directed.

14. The method of claim 11, wherein the dynamically partitioning the arrangement into the one or more broadcast regions comprises programming one or more registers of the one or more processing tiles of the plurality of processing tiles.

15. The method of claim 14, wherein the dynamically partitioning the arrangement into the one or more broadcast regions further comprises configuring routing operations for respective cross-point circuits of the plurality of processing tiles.

16. The method of claim 11, wherein the plurality of processing tiles to individually comprise one or more neural processor units and wherein the dynamically partitioning the arrangement into the one or more broadcast regions comprises dynamically partitioning the arrangement into a plurality of broadcast regions based, at least in part, on a respective plurality of neural network inference operations to be performed or based, at least in part, on a respective plurality of portions of a particular neural network inference operation to be performed, or a combination thereof.

17. An article, comprising: a non-transitory machine-readable medium having stored thereon instructions executable by a computing device to:
dynamically partition an arrangement comprising a plurality of processing tiles into one or more broadcast regions, wherein one or more processing tiles of the plurality of processing tiles to individually comprise a broadcast hub for a first broadcast region of the one or more broadcast regions.

18. The article of claim 17, wherein the non-transitory machine-readable medium has stored thereon further instructions executable by the computing device to designate a first processing tile of the first broadcast region as the broadcast hub for the first broadcast region at least in part by configuring a cross-point circuit of the first processing tile.

19. The article of claim 17, wherein the arrangement to be dynamically partitioned into the one or more broadcast regions based at least in part on one or more processor core utilization parameters, one or more power domain and/or energy consumption parameters, one or more memory bandwidth parameters, or one or more latency parameters, or any combination thereof.

20. The article of claim 17, wherein the arrangement to be dynamically partitioned into the one or more broadcast regions based at least in part on one or more user-specified partitioning parameters to include a particular range of a number of partitions to be utilized for a particular operation.

* * * * *